July 23, 1963  A. R. CRAWFORD  3,098,379
ENGINE BALANCE CLASSIFIER
Original Filed July 13, 1955

INVENTOR
Arthur R. Crawford,

BY Diggins & LeBlanc
ATTORNEYS

United States Patent Office 3,098,379
Patented July 23, 1963

3,098,379
ENGINE BALANCE CLASSIFIER
Arthur R. Crawford, Worthington, Ohio, assignor to International Research & Development Corporation, Columbus, Ohio, a corporation of Ohio
Original application July 13, 1955, Ser. No. 521,744, now Patent No. 3,023,613, dated Mar. 6, 1962. Divided and this application Jan. 30, 1961, Ser. No. 85,595
8 Claims. (Cl. 73—116)

This application relates to the balancing of internal combustion engines and more particularly relates to an engine balance classifier of a portable nature for determining which engines coming off an assembly line are in need of balancing.

This application is a division of application of Arthur R. Crawford, Serial No. 521,744, filed July 13, 1955, now Patent No. 3,023,613.

In the mass production of automobiles, the production balancing of automobile engines has generally been carried out only on the higher priced cars because of the economic factors involved. Where such production balancing has been carried out, it has generally involved a complete balancing of each and every engine coming off the assembly line. It has been found that this practice results in the balancing of a very considerable number of engines whose balance condition is actually satisfactory prior to the balancing procedure and thereby entails an unnecessary cost factor which militates against the use of production balancing of the engines of the lower priced automobiles.

According to the present invention there is provided a self-powered completely portable engine balance classifier which permits a rapid and accurate determination of which engines from an assembly line should be balanced and which engines do not require vibration analysis and balancing procedures. The unit is extremely simple in nature, utilizes no internal or external power supply and yet produces accurate and reproducible readings which will permit engine classification.

It is accordingly a primary object of the present invention to provide an engine classifier which permits the determination of which engines coming off a mass production assembly line are in need of balancing.

It is another object of the invention to provide an engine classifier of the foregoing type which is simple in nature, rugged in construction and accurate in its readings.

It is another object of the invention to provide an engine classifier which provides direct readings of the acceptability or unacceptability of two levels of vibration on the same meter or indicator.

It is another object of the invention to provide an engine balance classifier of the foregoing type which is self-powered and responsive only to the particular vibration frequency of interest.

These and other objects and advantages of the invention will become more apparent upon reference to the following specification and claims and appended drawings wherein:

Figure 2:
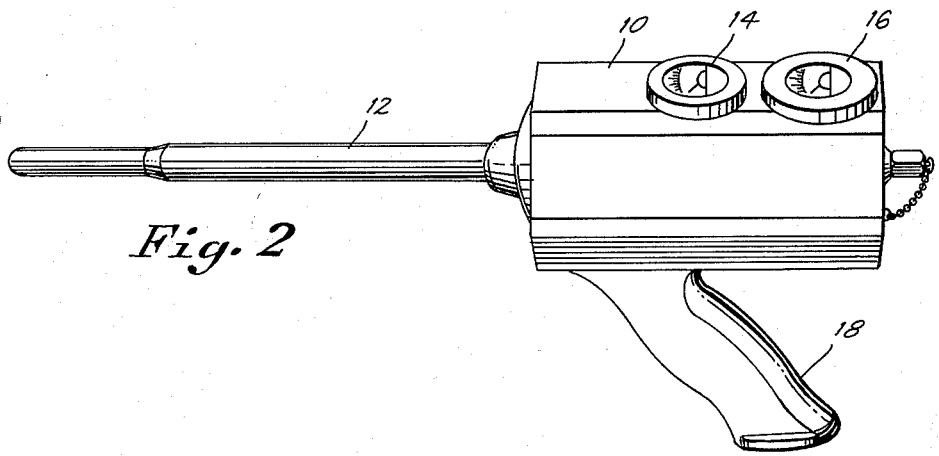
FIGURE 2 is a perspective view of the engine classifier.

Referring to FIGURE 2, there is shown a perspective view of a preferred embodiment of the engine balance classifier. There it will be seen that the classifier includes a generally cylindrical casing 10, a transducer probe 12, an unbalance indicating meter 14, and an engine speed indicating meter 16. The casing 10 contains a transducer and the associated circuitry for the transducer and meters and is mounted upon a pistol grip type handle 18. It will be apparent that through the selection of the appropriate metal in the construction of the unit, it can be made quite durable and capable of withstanding considerable abuse.

Figure 1:
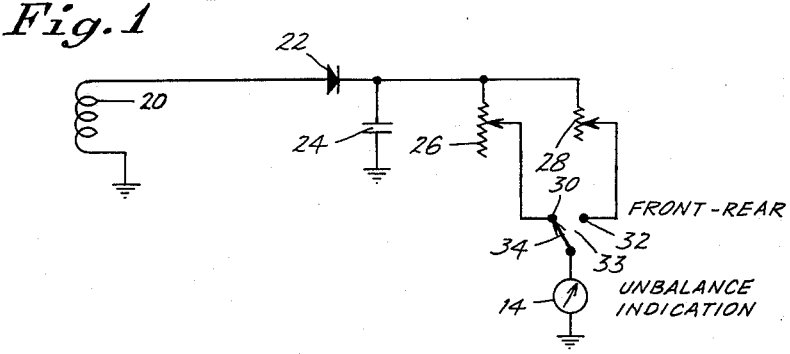
FIGURE 1 is a circuit diagram of the unbalance indicator in the engine classifier.

Referring to FIGURE 1, there is shown the circuit diagram of the unbalance indicator in the engine balance classifier. A transducer or pickup 20 which, according to the invention, is of the resonant type and is tuned to a preselected frequency such as, for example, 25 cycles per second plus or minus one cycle per second, has its upper lead connected to a chemical rectifier 22 which may, for example, be of the germanium type, and has its lower lead connected to ground. The other terminal of the rectifier 22 is connected to a large grounded condensor 24 and also to a pair of potentiometers 26 and 28 which have their variable taps connected to the stationary contacts 30 and 32 of a selector switch 33 having a movable arm 34. The movable arm 34 is connected to the grounded unbalance indicating meter 14.

Since, according to the invention, the transducer 20 is tuned to the desired frequency and acts as a filter, the signal produced is generally a sine wave and is subjected to half wave rectification by the rectifier 22. The pulses which pass this rectifier tend to maintain the condenser 24 in a charged condition and the voltage thereacross actuates the unbalance indicator 14.

The switch 33 switches the meter 36 from one potentiometer to the other and these potentiometers are utilized to calibrate the meter 14 for the allowable vibration in the front and rear end of the engine under test. It has been found that automobile engines have different vibration tolerances at the front and rear ends and these potentiometers permit one meter scale to give an accurate reading for both. Thus when the operator actuates the movable arm 34 of the switch 33 to select "front" or "rear" he automatically provides a standard for the unbalance indicator so that he does not have to read vibration amplitude in quantitative units but may merely make a simple "satisfactory," "unsatisfactory" type of reading.

Figure 3:
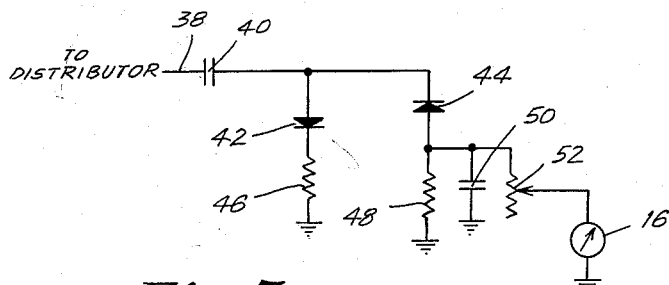
FIGURE 3 is a circuit diagram of the speed indicator in the engine classifier.

Since the transducer is of the sharply resonant type, it is desirable to have some indication of the engine speed so that it can be brought to the frequency for which the transducer is tuned. This is permitted in the engine classifier of the instant invention without the necessity of any additional mechanical connection to the engine by means of the speed indicator shown in FIGURE 3. Referring to that figure, a terminal 38 is provided on the classifier housing 10 for connection by the operator to the distributor of the engine being classified. This terminal is connected by a condenser 40 to a clipping stage consisting of rectifiers 42 and 44 which are connected to ground through resistors 46 and 48. An output is taken across resistor 48 which is paralleled by a condenser 50. This output is connected to a variable resistor 52 and thence to one terminal of a grounded engine speed meter 16.

The signal from the distributor of the engine under test produces a voltage across the resistor 48 which tends to maintain the condenser 50 in a charged condition and voltage across that condenser is read by means of the engine speed meter 16. The variable resistor or potentiometer 52 is utilized as a calibration adjustment so that when the engine is operating at the desired speed, a satisfactory reading of the engine speed meter 16 is obtained.

The adjustment of unbalance calibrating potentiometers 26 and 28 and of speed potentiometer 52 may be internal adjustments or may be made by means of a screwdriver inserted through access holes in the housing 10. With this type construction the operator who uses the instrument cannot upset its setting and accuracy. The only actual control which must be actuated by the operator is the "front-rear" switch 33 which may be plainly marked. There is no possibility of error through failure of the operator to connect the speed indicating circuit to the engine distributor since the speed meter will provide no reading unless this is done. Without a reading on the speed meter the operator is unlikely to bring the engine to the proper speed so that the vibration meter will also fail to provide a proper reading.

The unit is quite simple in construction and practically foolproof in the simplicity of its use. No batteries or other power supplies are necessary so that standardization or calibration need not be rechecked except at long intervals.

The operation of the classifier will be apparent. The operator connects the distributor lead to the engine distributor, notes the position of the "front-rear" switch 33 and places the probe 12 on the front or rear of the engine as the case may be. The operator then brings the engine up to the proper speed which is indicated on the meter 16. The vibration meter 14 indicates whether the vibration in that end of the engine is satisfactory or unsatisfactory. If unsatisfactory, the next test need not be made since the engine must be production balanced.

If the end first tested gives a satisfactory reading, the operator thereupon throws the selector switch 33 to the other position and places the probe 12 on the other end of the engine. If this end is also satisfactory, the engine need not be production balanced. If unsatisfactory a contrary course of action is indicated.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A portable engine balance classifier comprising a small portable casing containing: a transducer resonant to the frequency of vibration of an engine to be classified when it is running at a predetermined speed, a rectifier directly connected to the output of said transducer, a first meter, D.C. means connecting said first meter to said rectifier to cause said meter to indicate the amplitude of that component of the vibration to which the transducer is resonant, a terminal on said casing for electrically connecting said classifier to said engine to transmit the frequency of rotation of said engine to the classifier, a rectifier connected to said terminal, a second meter, and means connected between said meter and said rectifier to cause said meter to indicate the speed of rotation of said engine under classification for indicating said predetermined speed.

2. A portable engine balance classifier comprising a small portable casing containing: a transducer resonant to the frequency of vibration of an engine to be classified when it is running at a predetermined speed; a first rectifier having one terminal directly connected to one terminal of said transducer and having the other terminal directly connected to one terminal of a first condenser; the other terminal of said first condenser being directly connected to the other terminal of said transducer; a pair of variable resistors each directly connected at one end to said other terminal of said first rectifier; a switch having one movable and two stationary contacts; the other ends of said variable resistors being respectively connected to one of said stationary contacts; a first meter having one terminal directly connected to said movable contact of said switch and the other terminal directly connected to said other terminal of said transducer; a terminal on said casing for electrically connecting said classifier to said engine to transmit the frequency of rotation of said engine to the classifier; a second condenser directly connected to said casing terminal and to opposite terminals of a second and third rectifier; a pair of fixed resistors having a pair of common terminals which are directly connected to the other terminal of said transducer; the other terminals of said fixed resistors being respectively connected to one of the other terminals of said second and third rectifiers; a third condenser directly connected to said other terminal of one of said second and third rectifiers and to the common terminals of said fixed resistors; a second meter connected to said common terminals of said fixed resistors; and a third variable resistor directly connecting the other terminal of said second meter to said other terminal of one of said second and third rectifiers for indicating said predetermined speed so that said first meter may indicate whether said engine is vibrating at said frequency of vibration.

3. A portable engine balance classifier for determining the balance condition of an engine when it is running at a predetermined speed comprising a small portable casing containing: transducer means resonant to the frequency of vibration of said engine for generating an A.C. signal when said engine is running at said predetermined speed; said transducer means being adapted to mechanically connect said classifier to said engine; first rectifier means directly connected to said transducer means for converting said A.C. signal to a first D.C. signal; first storage means coupled across said transducer and first rectifier means for developing a first voltage which is substantially equal to the peak voltage of said first D.C. signal; a first meter coupled to said first storage means for indicating whether said peak voltage of said first D.C. signal is above or below a predetermined voltage level; a terminal on said casing for electrically connecting said classifier to said engine so that the frequencies of rotation developed by said engine when it is running may be coupled to said classifier; second rectifier means coupled to said terminal for converting said frequencies of rotation of said engine to a second D.C. signal; second storage means coupled across said second rectifier means for developing a second voltage which is substantially equal to the peak voltage of said second D.C. signal; second meter means coupled to said second storage means and adapted to indicate the speed of rotation of said engine at said predetermined speed when said transducer means is mechanically coupled to said engine; and said first and second meters being mounted on said casing so that said meters are both visible to an operator of said portable classifier.

4. A portable engine classifier for determining the balance condition of an engine when it is running at a predetermined speed comprising a small portable casing containing: a transducer sharply resonant to the frequency of vibration of said engine for generating an A.C. signal when said engine is running at said predetermined speed; said transducer being adapted to mechanically connect said classifier to said engine; a first rectifier directly connected to said transducer for converting said A.C. signals to a first D.C. signal; a first capacitor connected across said transducer and first rectifier for developing a first voltage which is substantially equal to the peak voltage of said first D.C. signal; a first meter coupled across said first capacitor for indicating whether said peak voltage of said first D.C. signal is within a predetermined range of voltages; a terminal on said casing for electrically connecting said classifier to said engine so that the frequencies of rotation developed by said engine when it is running may be coupled to said classifier; rectifier means A.C. coupled to said terminal for converting said frequencies of rotation of said engine to a second D.C. signal; a second capacitor coupled across said rectifier means for developing a second voltage which is substantially equal to the peak voltage of said second D.C. signal; a second meter coupled across said second capacitor and adapted to indicate the speed of rotation of said engine at said predetermined speed when said transducer is mechanically coupled to said engine; and said first and second meters being mounted on said casing so that said meters are both visible to an operator of said portable classifier.

5. A classifier in accordance with claim 4 wherein: said transducer has one of its terminals directly connected to one terminal of said first rectifier and its other terminal connected to a reference potential; said first capacitor has one of its terminals directly connected to the other terminal of said rectifier and its other terminal connected to said reference potential; and said first meter has one of its terminals coupled to said one terminal of said first capacitor through D.C. means and its other terminal connected to said reference potential.

6. A classifier in accordance with claim 5 wherein: said rectifier means includes second and third rectifiers having opposite terminals connected to said casing terminal through a third capacitor and their other terminals connected through respective resistors to said reference potential; said second capacitor having one of its terminals connected to the junction of one of the other terminals of said second and third rectifiers and its respective resistor and having its other terminal connected to said reference potential; and said second meter having one of its terminals connected to said one terminal of said second capacitor through an adjustable resistor and its other terminal connected to said reference potential.

7. A classifier in accordance with claim 6 wherein: said D.C. means includes a pair of adjustable resistors and a single pole double throw switch; said switch having two stationary contacts and one movable contact; said pair of resistors each having one of its terminals connected to said one terminal of said first capacitor and its other terminal respectively connected to said stationary contacts of said switch; and said movable contact of said switch being connected to said one terminal of said first meter.

8. A portable engine balance classifier for throttle controlled internal combustion engines comprising: a portable casing small and light enough to be manually handled with one hand, a transducer carried by said casing and self resonant to the frequency of vibration which occurs when said engines are run at a predetermined speed, a first meter carried by said casing in a position to be visible to an operator holding said casing so that said transducer is in engagement with an engine, rectifier means connected to the output of said transducer and to said meter so that when said engine is run at said predetermined speed, said meter indicates the amplitude of that component of vibration to which the transducer is resonant, a second meter carried by said casing adjacent said first meter in a position such that an operator holding said casing so that said transducer is in engagement with an engine may simultaneously observe the readings of both said meters, connection means carried by said casing, second rectifier means connected between said connecting means and said second meter means so that when said connecting means is connected to the ignition system of an engine under test, said second meter indicates said predetermined speed of said engine.

References Cited in the file of this patent

UNITED STATES PATENTS

| | | |
|---|---|---|
| 1,961,007 | Marvin | May 29, 1934 |
| 2,074,417 | Olsen | Mar. 23, 1937 |
| 2,473,542 | Philpott | June 21, 1949 |
| 2,799,015 | Bell | July 9, 1957 |
| 2,826,706 | Sackett | Mar. 11, 1958 |